United States Patent
Suenaga

[11] Patent Number: 6,106,075
[45] Date of Patent: Aug. 22, 2000

[54] ROAD WHEEL WITH IMPROVED VIBRATION CHARACTERISTICS AND METHOD OF CONSTRUCTING AND UTILIZING SAME

[75] Inventor: Toshihiko Suenaga, Tochigi, Japan

[73] Assignee: Honda Giken Kogyo Kabushiki Kaisha, Tokyo, Japan

[21] Appl. No.: 09/088,803

[22] Filed: Jun. 2, 1998

[51] Int. Cl.[7] ................................................ B60B 19/00
[52] U.S. Cl. ...................... 301/6.91; 301/64.1; 301/95; 295/7; 152/381.6
[58] Field of Search ................... 301/6.91, 63.1, 301/64.3, 65, 104, 95, 97; 295/7, 8, 30; 152/381.5, 381.6

[56] References Cited

U.S. PATENT DOCUMENTS

| | | | |
|---|---|---|---|
| 2,129,178 | 9/1938 | Jordan | 295/7 |
| 2,197,583 | 4/1940 | Koeppen et al. | 301/6.91 |
| 3,253,862 | 5/1966 | Watanabe et al. | 301/65 |
| 4,000,926 | 1/1977 | Wilcox | 301/64.3 |
| 4,150,854 | 4/1979 | Lohmeyer | 301/97 X |
| 4,216,809 | 8/1980 | Pixley . | |
| 4,248,286 | 2/1981 | Curtiss . | |
| 4,256,347 | 3/1981 | Reppert . | |
| 4,281,700 | 8/1981 | Ross . | |
| 4,369,825 | 1/1983 | Nilsson . | |
| 4,374,535 | 2/1983 | Watts | 152/381.6 |
| 4,392,522 | 7/1983 | Bschorr . | |
| 4,444,435 | 4/1984 | Honsa . | |
| 4,571,005 | 2/1986 | Nowak et al. | 295/30 X |
| 5,092,192 | 3/1992 | Pelzer | 295/7 X |
| 5,103,595 | 4/1992 | Dale . | |
| 5,237,505 | 8/1993 | Beebe . | |
| 5,479,974 | 1/1996 | Noggle . | |
| 5,899,253 | 5/1999 | Marron et al. | 301/6.91 X |

FOREIGN PATENT DOCUMENTS

| | | | |
|---|---|---|---|
| 2018622 | 2/1977 | Japan | 301/6.91 |

*Primary Examiner*—Russell D. Stormer
*Attorney, Agent, or Firm*—Carrier, Blackman & Associates, P.C.; Joseph P. Carrier; William D. Blackman

[57] ABSTRACT

An automotive road wheel with improved vibration characteristics comprises a wheel body, and at least one pocket defined in the wheel body for altering a resonant frequency of vibrations of the wheel body. The wheel body is preferably formed of aluminum or a lightweight metal alloy, and includes a rim, a hub, and a plurality of spokes radially connected between the rim and the hub. The pocket is an enclosed space within the wheel body, the wheel preferably includes a plurality of the pockets defined in the spokes, respectively, a vibration damping material may be disposed in some or all of the pockets, and a sheet of vibration damping material may also be disposed concentrically about the rim.

12 Claims, 4 Drawing Sheets

ROAD WHEEL WITH IMPROVED VIBRATION CHARACTERISTICS AND METHOD OF CONSTRUCTING AND UTILIZING SAME

1. Field of the Invention

The present invention pertains to a road wheel with improved vibration characteristics for use on automotive vehicles and the like. More particularly, the present invention pertains to such a road wheel formed of aluminum or a lightweight metal alloy which is modified from conventional designs such that a level of noise caused by vibrations of the wheel during vehicle travel is reduced and/or adjusted so as to be less perceptible to occupants of the vehicle.

2. Description of Relevant Art

In the art of road wheels for vehicles, such as automobiles, it is known that the road wheels vibrate as the vehicles are traveling due to contact between the wheels and the road surface, and that such wheel vibrations are transmitted to the vehicle body through the wheel suspension and, if the wheel is a driven wheel, through the drive shaft and engine, while occupants of the vehicle sense the vibrations from the vehicle body. The wheel vibrations occur in almost all traveling speed ranges of the vehicle and tend to generate a maximum or peak sound pressure (noise) level perceptible to the vehicle occupants at resonant frequencies of the wheels. In general, the greater the noise level generated by the wheel vibrations, the more disturbing the vibrations are to the vehicle occupants.

In an effort to reduce the noise levels caused by wheel and tire assemblies of vehicles, various systems and methods have been proposed, including those disclosed in U.S. Pat. Nos. 4,369,825, 4,392,522, 5,237,505, and 5,479,974.

According to U.S. Pat. No. 4,369,825, a wheel and tire assembly is disclosed in which the wheel rim has a plurality of sub-rims disposed concentrically thereon which are separated from each other in the axial direction of the rim, and a plurality of sub-tires, each of which is associated with a corresponding one of the sub-rims. Further, each of the sub-tires may be partially or completely filled with soft rubber or a soft plastic material for further improving the noise characteristics thereof. As will be understood, this design involving a plurality of sub-rims and sub-tires is dramatically different than conventional wheel and tire assemblies involving use of a single tire on a wheel.

U.S. Pat. No. 4,392,522 discloses a wheel and tire assembly in which the noise caused thereby is reduced by enclosing in the space confined by the tire and wheel rim a noise or sound absorbing or insulating material. The noise absorbing/insulating material is preferably constructed of an open cell foam, may be constructed in various shapes, and may be connected to the inner tire surface or to the rim surface facing into the tire. Also, disclosed is a coating of anti-droning foam material on front and back surfaces of the rim.

U.S. Pat. No. 5,237,505 discloses a method and apparatus for reducing the tendency of a tire and wheel assembly to vibrate in which the mass of the assembly is altered to produce a static imbalance which, when combined with a static imbalance initially inherent in the assembly, results in a desired non-static imbalance oriented so as to induce a centrifugal force which opposes, and therefore tends to cancel, at least one component (such as the first order harmonic) of radial force variation characterizing the assembly.

U.S. Pat. No. 5,479,974 discloses a noise reduction system for a vehicle wheel assembly including a plurality of baffles formed of flexible non-supporting sheet material attached at one end thereof within the inner chamber of a pneumatic tire such that each of the baffles assumes a collapsed state when the wheel assembly is stationary and assumes an extended position within the inner chamber of the tire under the influence of centrifugal force when the wheel assembly is rotating. The extended baffle structure tends to reduce the amount of acoustic resonance within the chamber during vehicle travel by changing the characteristics of sound waves created within the inner chamber.

Although the known methods and apparatus for reducing the noise level of vibrations caused by wheel and tire assemblies are effective for their intended purposes, the known methods and apparatus tend to be relatively complex in terms of manufacturing and/or assembling wheel and tire assemblies to include same, and it otherwise remains desirable to achieve a further reduction in the noise level caused by vibrations of wheel and tire assemblies.

SUMMARY OF THE INVENTION

The present invention has been developed to overcome the limitations and disadvantages attendant the known methods and systems for reducing the noise level caused by vibrations of wheel and tire assemblies of vehicles while traveling, and to generally film a need in the art for a road wheel with improved vibration characteristics, and which is otherwise relatively simple and economic to manufacture and assemble for use on a vehicle.

According to the invention there is provided an automotive road wheel with improved vibration characteristics, comprising a wheel body suitable for high speed travel and at least one pocket defined in the wheel body for adjusting a resonant frequency of the wheel.

Preferably, the wheel body is formed of aluminum or a lightweight alloy; the pocket is an enclosed space within the wheel body; a vibration damping material is also provided with the wheel body, such as by being contained in the pocket; and the pocket is disposed at a predetermined position of the wheel body to achieve a predetermined vibration characteristic of the wheel.

It is particularly preferred that the wheel body includes a rim, a hub, and a plurality of spokes connected radially between the rim and the hub, with one or more of the pockets being defined in one or more of the spokes, respectively, a vibration damping material disposed in one or more of the pockets, and a ring or layer of high vibration damping material disposed concentrically about the rim.

According to the invention there is also provided a road wheel for a vehicle, comprising: a rim; a hub formed coaxially with said rim; a plurality of spokes connected radially between said hub and said rim; and at least one of the spokes having a modified portion defined therein that reduces a noise level generated by the wheel during travel when the wheel vibrates below a predetermined frequency.

Preferably, the predetermined frequency is a high resonant frequency of the wheel; the modified portion is dimensioned and arranged on the spoke such that the wheel vibrates at a higher resonant frequency than if the wheel were not provided with the modified portion, whereby the maximum noise level generated by the wheel is reduced when it vibrates at frequencies below the high resonant frequency thereof; the modified portion is a pocket defined in the spoke; the wheel further comprises vibration damping material disposed in the pocket and/or concentrically about the rim; and a plurality of the spokes will have at least one of the modified portions defined therein.

According to either of the above-described road wheels according to the invention, the modified or pocket portion(s) of the spoke(s) of the wheel body desirably reduce the amount of wheel vibration noise sensed by occupants of the vehicle because the pocket(s) or modified portion(s) alters (preferably increases) a resonant frequency of the wheel as it vibrates during travel in comparison to a road wheel with spokes that do not have a pocket or modified portion defined therein. Particularly, applicant has determined that there are a plurality (typically three) types of road noise peaks associated with road wheels of vehicles during travel corresponding to resonant frequencies of the wheels, including a low frequency road noise peak, a middle frequency road noise peak and a high frequency road noise peak; and that if any of the road noise peaks is close to other peak(s), occupants of the vehicle can strongly sense the noise. On the other hand, by altering resonant frequencies of the road wheels through provision of the pocket(s) or modified portion(s) according to the invention, the high frequency road noise peak generated by the road wheels is significantly shifted or separated from the middle frequency road noise peak, so the vehicle occupants sense the high frequency road noise peak to a desirably smaller extent.

Further, applicant has determined that if the high frequency road noise peak of the road wheel (corresponding to its resonant frequency) is shifted to a high value of 400 Hz or more, occupants of the vehicle can hear the noise but don't fully sense or feel it as a road noise. Instead, the high frequency road noise peak blends in with or hides among other noises such as wind noise, engine noise, etc., which gives vehicle occupants a much more comfortable ride.

According to the invention, there is further provided a wheel for a vehicle comprising a rim extending circumferentially around the wheel, a hub formed coaxially with the rim, a plurality of spokes connected radially between the hub and the rim, and a sheet of vibration damping material disposed coaxially about the rim, and substantially completely covering an outer surface of the rim that is covered when a tire is fitted over the rim, for reducing a noise level of vibrations of the wheel during travel.

Preferably, at least one of said spokes has a modified portion formed therein for altering a resonant frequency of vibrations of the wheel.

It is an object of the invention to provide a road wheel having improved vibration characteristics in comparison to conventional road wheels through provision of a relatively simple means/modification in the structure of the road wheel.

It another object of the invention to provide such a road wheel which is relatively simple, and hence economic, to manufacture and install on a vehicle.

It is a further object of the invention to provide such a road wheel having an appearance which is identical to conventional road wheels.

It is still another object of the invention to provide such a road wheel which is lightweight.

It is yet another object of the invention to provide such a road wheel which may be readily adapted or modified to provide optimum vibration characteristics when used on different vehicles.

Other objects, advantages, and salient features of the invention will become apparent from the following detailed description which, when considered in conjunction with the annexed drawings, describes presently preferred embodiments of the invention.

DETAILED DESCRIPTION OF THE PREFERRED EMBODIMENTS

Figure 1:
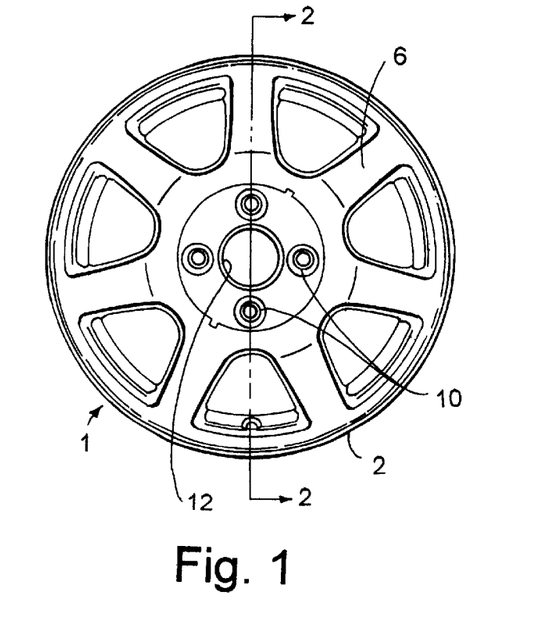
FIG. 1 is a front elevational view of a conventional road wheel formed of aluminum or other light weight metal alloy.
Figure 2:
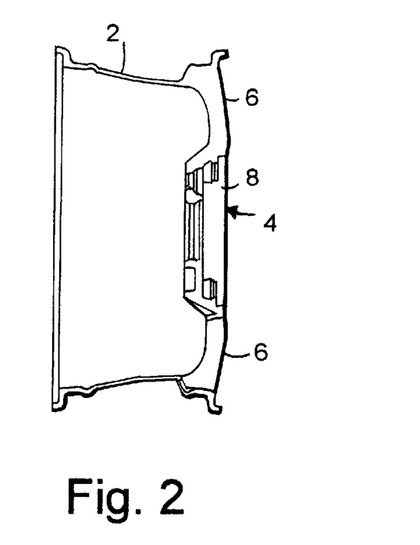
FIG. 2 is a sectional side view looking in the direction of line 2—2 in FIG. 1.

Referring to FIGS. 1 and 2, there is shown a conventional road wheel 1 formed of aluminum or other light weight metal alloys. The wheel 1 includes a rim 2, a hub 4, and a plurality of spokes 6 interconnecting the hub and rim. The hub 4 has a mounting wall 8 with a plurality of smaller openings 10 and a single larger opening 12 defined therethrough for being connected to a suspension and axle (not shown).

The conventional wheel 1 is typically cast as a unitary member from aluminum or other light metal alloys, and typically has a finished outer surface so that it is unnecessary to utilize a decorative trim such as hub cap therewith. Also, to the extent that the wheel 1 is formed of aluminum or other light weight metal alloys, it tends to favorably reduce the weight of the vehicle.

As with any road wheel, the wheel 1 vibrates over a large frequency range, such as 50–4,000 Hz, while the vehicle is traveling at substantially any given speed, and with the conventional wheel 1 there are typically 3 primary road noise peaks experienced at different parts of the frequency range during the vehicle travel at the given speed. For example, a low frequency road noise peak may be experienced at approximately 80 Hz, a middle frequency road noise peak may be experienced in the range of 100 Hz through 160 Hz or 200 Hz, and a high frequency road noise peak may be experienced in the range of 250 Hz through 400 Hz. As will be recognized, the low end of the middle range (100 Hz) is close to the low frequency road noise peak of 80 Hz, while the upper end of the middle range (200 Hz) is close to the low end of the high range (250 Hz). As mentioned above, when the road noise peaks are close to each other this is undesirable because the noise can be felt or sensed by occupants of the vehicle to a larger extent.

Figure 3:
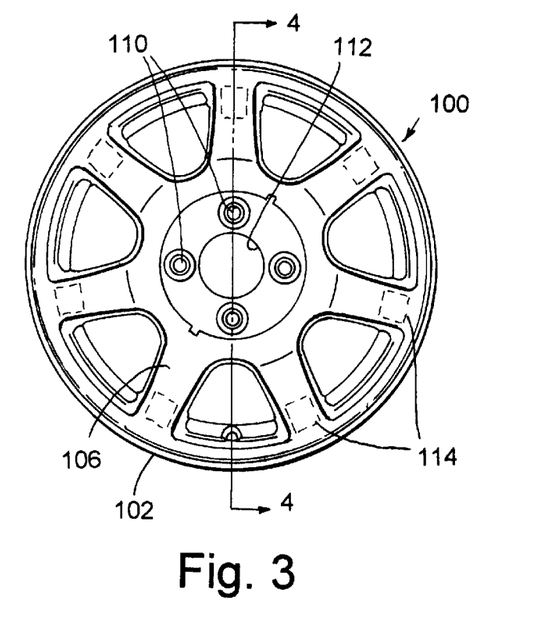
FIG. 3 is a front elevational view according to a first preferred embodiment of the invention.
Figure 4:
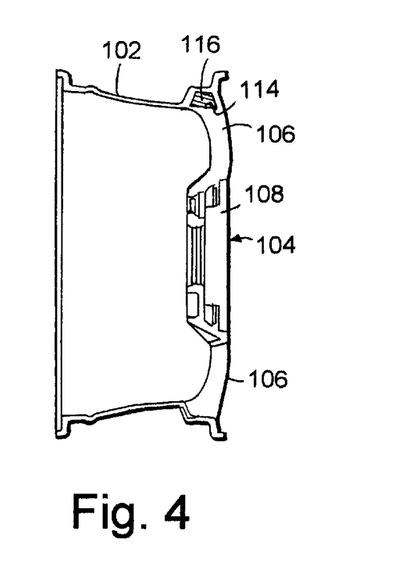
FIG. 4 is a sectional side view taken in the direction of line 4—4 in FIG. 3.

With reference to FIGS. 3 and 4, there is shown an improved road wheel 100 according to a first presently preferred embodiment of the invention. From its exterior, the wheel 100 appears identical to the conventional wheel 1 of FIGS. 1 and 2 because it includes a rim 102, a hub 104, spokes 106, a mounting wall 108, small through holes 110, and a large through hole 112. Additionally, however, the wheel 100 includes at least one pocket portion 114 formed in at least one of the spokes 106, and preferably includes a plurality of the pocket portions 114, with one of the pocket portions 114 defined in each of the spokes 106, respectively, as shown. The pocket portions 114 may be hollow, but are preferably filled with a damping material 116 as shown in FIG. 4. The damping material is preferably lightweight and has a high damping characteristic, and may, for example, comprise water, other liquids, silicone, a natural or synthetic rubber, urethane foam or other foams, etc. As used herein, the term "hollow" indicates that the pocket portions may be filled with a gas such as air or a compressed gas, or may have a vacuum formed therein. Further, to the extent a liquid or solid damping material 116 is disposed in the pocket portions, the damping material may only partially fill the pocket portions, or the damping material 116 may be provided in only some of the pocket portions 114 formed in the wheel. Still further, more than one of the pocket portions 114 could be formed in one or more of the spokes 106.

The pocket portions 114 are preferably formed in the spokes 106 because the spokes have a much greater thickness or mass than the rim 102 or the hub 104 and will still have sufficient structural strength and rigidity with the pocket portions 114 formed therein. Alternatively, however, one or more pocket portions of an appropriate size and shape could be formed in the rim 102 or the hub 104.

Figure 9:
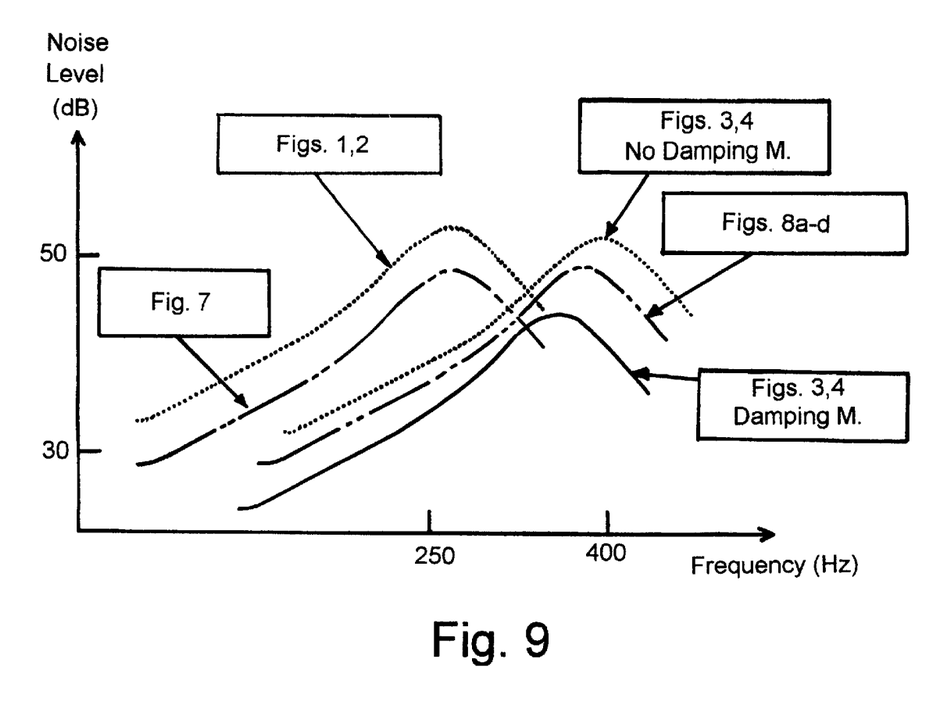
FIG. 9 is a graph showing the noise levels generated at various vibrating frequencies of a conventional road wheel shown in FIGS. 1 and 2 and the road wheels according to the invention while a vehicle is traveling at a given speed.

With reference to FIG. 9, there is shown a graph of noise level, or energy of vibration, of wheel vibrations on the ordinate and frequency of road wheel vibrations on the abscissa for a given traveling speed of a vehicle, such as a speed in the range of 40–100 km/hr. Different curves shown in the graph correspond to the conventional wheel 1 of FIGS. 1 and 2, the wheel 100 according to the invention having just the pocket portions 114 formed in the spokes 106, and the wheel 100 according to the invention including the damping material 116 filled in the pocket portions 114, as indicated. Comparing the curve for the conventional wheel 1 with the curve of the wheel of the invention with only the pocket portions 114, it can be seen that a high frequency road noise peak, corresponding to a resonant frequency, of the conventional wheel 1 occurs at slightly less than 250 Hz, whereas the peak for the wheel 100 of the invention occurs as slightly greater than 400 Hz. Although the noise level peak at the resonant frequency of the wheel 100 according to the invention is only slightly less than the noise level peak at the resonant frequency of the conventional wheel 1, the fact that the resonant frequency is shifted to a substantially higher value according to the invention desirably, significantly reduces the extent to which the wheel vibrations are sensed or felt by occupants of the vehicle for such reasons as previously discussed. Particularly, by shifting the high frequency road noise peak at the resonant frequency away from the high end of the middle frequency road noise peak range it is felt to a much smaller degree by the vehicle occupants, and when the high frequency road noise peak at the resonant frequency is shifted above 400 Hz it tends to be hidden among other noises such as wind noise, engine noise, etc. so that the vehicle occupants do not feel it as a road noise.

Still referring to FIG. 9, when the vibration damping material 116 is disposed in the pockets 114 of the wheel 100, the high frequency road noise peak at the resonant frequency of the wheel is shifted to a higher frequency than the conventional wheel 1 shown in FIGS. 1 and 2, but it is not shifted quite as high as the wheel 100 in which the pocket parts 114 are hollow. For example, the resonant frequency of the wheel 100 when the pocket parts 114 have a liquid or solid vibration damping material 116 disposed therein is shifted to 350 Hz or 400 Hz, rather than being shifted to a value above 400 Hz when the pocket portions 114 are hollow. The liquid or solid damping material 116 is lighter in weight than the aluminum or metal alloy from which the wheel 100 is formed, but is nowhere near as light as when pocket portions 114 are hollow, whereby the resonant frequency of the wheel is not shifted to as great an extent.

Significantly, however, the vibration damping material 116 disposed in the pockets 114 also desirably, greatly reduces the noise level caused by the vibrations of the wheel over a large portion of the vibration frequency range of the wheel where the vibrations are mostly noticed by occupants of the vehicle as compared to both the conventional wheel 1 without pocket portions and as compared to the wheel 100 without damping material 116 in the pocket portions 114. For example, the damping material 116 disposed in the pocket portions 114 may reduce the noise level caused by wheel vibrations by 10–40 decibels over a frequency range of 50–400 Hz as compared to the conventional wheel 1, and may reduce the noise level by 5–25 decibels over a frequency range of 50–1500 Hz as compared to the wheel 100 without damping material in the pocket portions 114.

According to the invention, the wheel 100 having the pocket portions 114 defined in the spokes 106 thereof, and preferably including the vibration damping material 116 disposed in the pockets 114, may be constructed in various ways. According to a first method, the wheel 100 may be cast as a single, unitary member from aluminum or other lightweight metal alloy similar to the conventional wheel 1, after which the pocket portions 114 may be formed into the spokes 106 of the wheel by drilling or the like, after which the vibration damping material 116 may be placed into the openings if the material 116 is to be used, and the outer end of the opening is then sealed with a plug formed of aluminum or other lightweight metal alloy, such as the material used in forming the wheel 100.

According to another method, the wheel 100 may be constructed in two pieces, with recesses corresponding to the pocket portions 114 defined in one of the two pieces, and the two pieces are welded or otherwise joined together such that the second piece covers and seals the recesses defined in the first piece with the pocket portions 114 defined between the pieces of the wheel as joined together. If a damping material 116 is utilized, it would be placed in the recess prior to joining the two pieces together.

For example, if the vibration damping material is a foam, the material may be cured or foamed after it is placed in the openings or recesses in the wheel such as by heating up the entire wheel to an appropriate temperature, but in such case the plugs should not seal the openings in the wheel until after the vibration damping material is foamed.

Figure 5A:
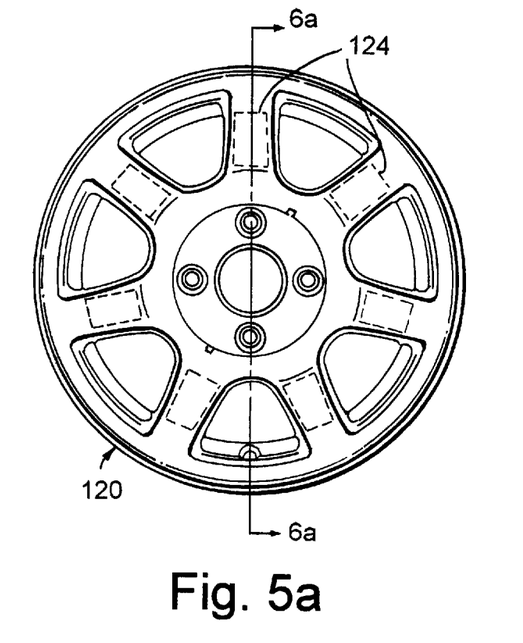
FIGS. 5a, 5b and 5c are front elevational views of a road wheel similar to the first embodiment of FIG. 1, but including modified pocket portions.
Figure 5B:
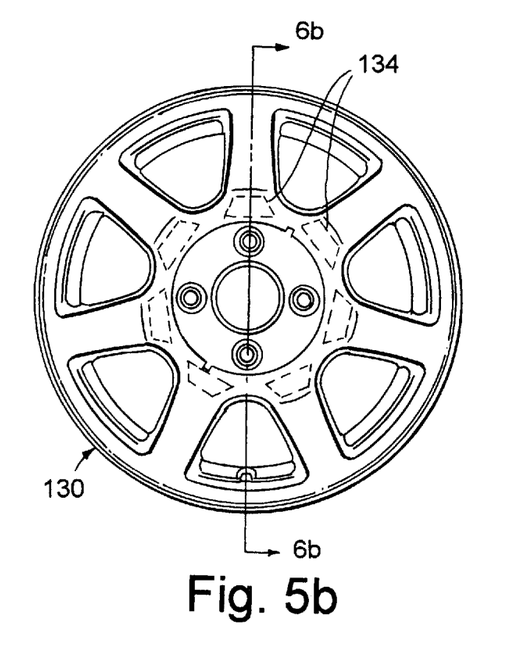
Figure 5C:
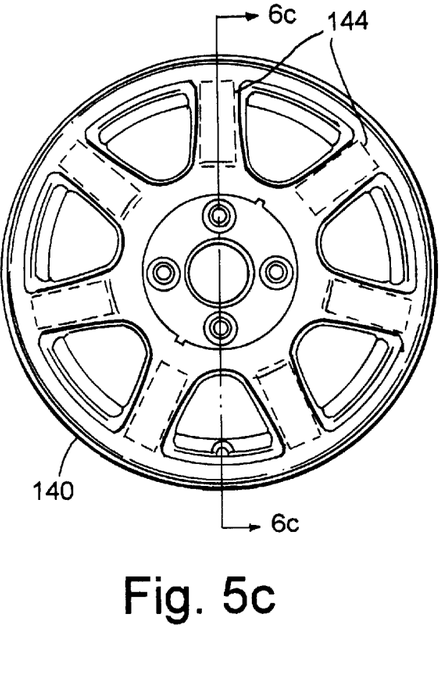
Figure 6A:
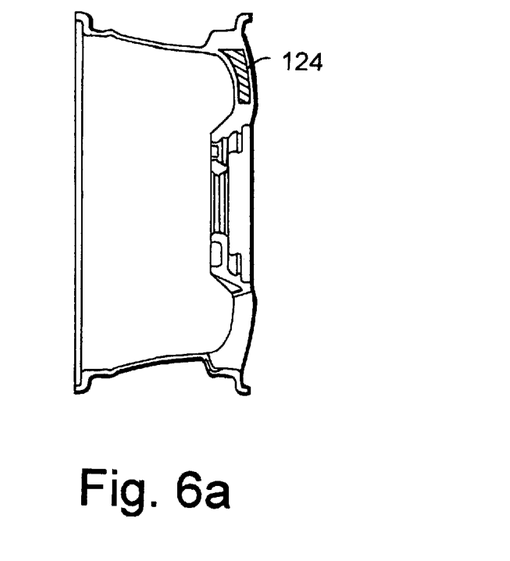
FIGS. 6a, 6b, 6c are sectional side views of the modified road wheels shown in FIGS. 5a, 5b, and 5c, respectively.
Figure 6B:
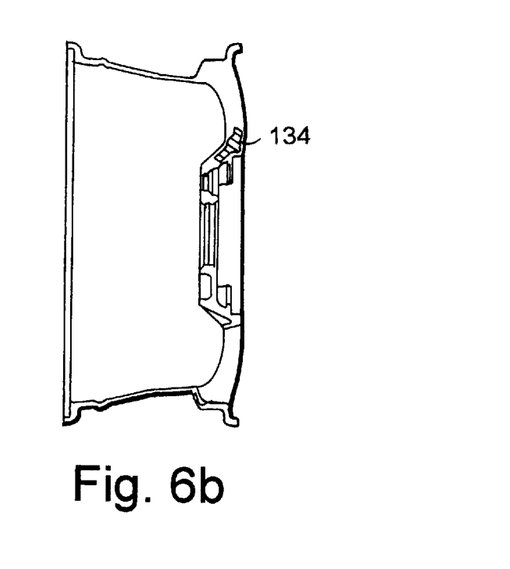
Figure 6C:
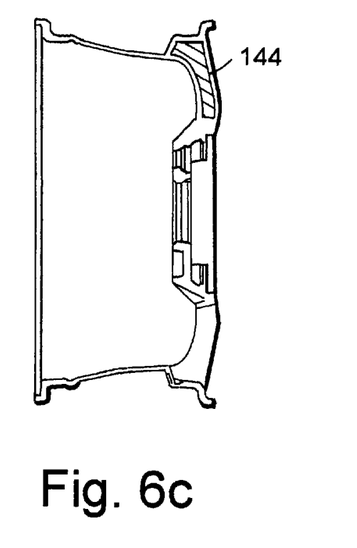

Referring to FIGS. 5a–5c, and 6a–6c, there are shown modified wheels 120, 130, 140 similar to the wheel 100 of FIGS. 3 and 4 according to the invention. As shown, the differences between the modified wheels 120, 130, 140 and the wheel 100 of FIGS. 3 and 4 are exclusively in the shape, size and location of the pocket portions within the spokes of the wheels. The pocket portions 114 of the wheel 100 are disposed in radially outer portions of the spokes 106 with a longitudinal or longest axis of the pocket portions extending substantially parallel to the rotational axis of the wheel. On the other hand, the pocket portions 124 of the wheel 120 shown in FIGS. 5a, 6a are disposed at radially intermediate portions of the spokes with a longitudinal axis thereof extending substantially perpendicular to the rotational axis of the wheel. The pocket portions 134 in the wheel 130 of FIGS. 5b, 6b are disposed at radially inner portions of the spokes with one axis extending parallel to an outer surface of the spokes and another axis extending diagonally to the rotational axis of the wheel, and the pocket portions 144 of the modified wheel 140 shown in FIGS. 5c, 6c are disposed at radially intermediate and outer portions of the spokes, with one axis extending parallel to the outer surface of the spokes and another axis extending substantially parallel to the rotational axis of the wheel. As shown, the pockets may occupy only small portions of the spokes.

The pocket portions 124, 134, 144 of each of the modified wheels 120, 130, 140, respectively, may be hollow or have a vibration damping material disposed therein similar to the pocket portions 114 of the wheel 100 shown in FIGS. 3 and 4. Externally, the wheels 120, 130, 140 appear identical to the wheel 100, and the wheel 120, 130, 140 with the pocket portions 124, 134, 144 and any vibration damping material disposed therein achieve the same advantages as discussed above in relation to the wheel 100.

The specific pocket portions 114, 124, 134, 144 shown in the drawings are not intended to be exhaustive of the sizes, shapes, or locations of pocket portions that may be disposed in the wheels according to the invention, but instead represent the presently preferred sizes, shapes, and locations of pocket portions according to the invention. As a practical matter, the pocket portions used according to the invention will be sized, shaped and located in an appropriate manner necessary to achieve a desired or predetermined vibration characteristic corresponding to a desired or predetermined resonant frequency of a given wheel.

Figure 7:
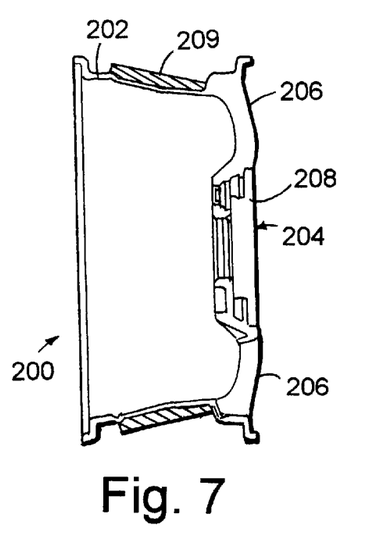
FIG. 7 is a sectional view of a road wheel according to a second preferred embodiment of the invention.
Figure 8A:
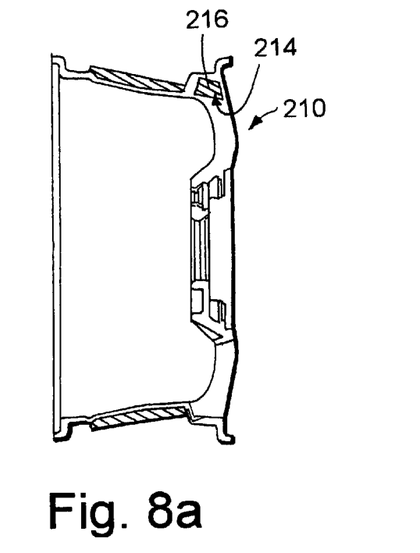
FIGS. 8a, 8b, 8c, and 8d, are respective sectional side views of modified road wheels according to the second embodiment of the invention.
Figure 8B:
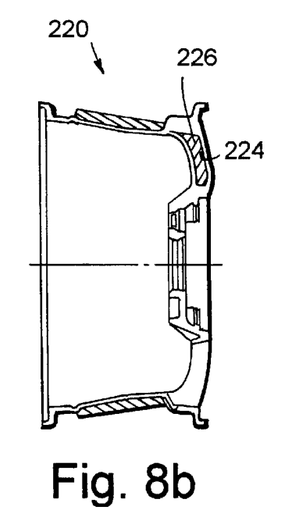
Figure 8C:
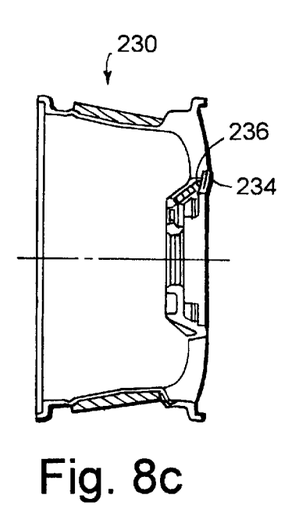
Figure 8D:
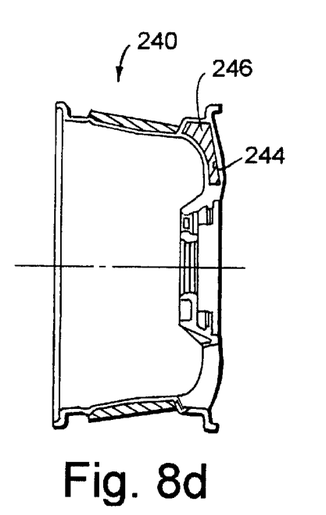

Referring to FIG. 7, there is shown a wheel 200 according to a second presently preferred embodiment of the invention. FIG. 7 is a side sectional view of the wheel 200 similar to the side sectional views of FIGS. 2 and 4. The wheel 200 includes a rim 202, a central hub 204, and a plurality of spokes 206 connected between the rim and the hub, but unlike the wheel 100 of FIGS. 3 and 4, it does not include any pocket portions in the spokes 206. Instead, the wheel 200 has a sheet of vibration damping material 209 disposed concentrically about the rim 202 in an area that would be completely enclosed between the rim 202 and a pneumatic tire (not shown) disposed thereon. The damping material 209 is preferably a solid, high damping material such as natural or synthetic rubber, silicone rubber, foams, etc., and may either be bonded to the rim using an appropriate adhesive or an inherent adhesiveness of the material itself or simply disposed about the rim 202 without being bonded thereto. As shown, the damping material preferably, substantially fully covers the outer surface of the rim that will be enclosed within the pneumatic tire, and has a thickness which is greater than that of the rim 202, for thereby achieving a significant damping effect. The material 209 could, however, be shaped other than as a sheet, and may be formed of materials besides high vibration damping materials.

Again referring to FIG. 9, the noise level caused by vibrations of the wheel 200 having the damping material 209 disposed concentrically about the rim 202 is significantly reduced as compared to the conventional wheel 1 of FIGS. 1 and 2 by approximately 10–30 decibels over substantially the entire frequency range of wheel vibrations. On the other hand, the resonant frequency of wheel vibrations is not shifted to any appreciable extent relative to the resonant frequency of the wheel 1 shown in FIGS. 1 and 2, contrary to the wheel 100 having pockets 114 in the spokes 106 thereof according to the first embodiment shown in FIGS. 3 and 4, or according to any of the modified embodiments shown in FIGS. 5a–5c and 6a–6c.

Referring to FIGS. 8a–8d, there are shown four modified wheels 210, 220, 230, 240 similar to the wheel 200 according to the second preferred embodiment of the invention. Each of the FIGS. 8a–8d is a sectional side view of a wheel very similar to the side views shown in FIGS. 4, 6a, 6b, 6c, respectively, noting that the modified wheels 210, 220, 230, 240 respectively shown in FIGS. 8a–8d have respective pocket portions 214, 224, 234, 244 which are sized, shaped, and located the same as the pocket portions 114, 124, 134, and 144 shown in FIGS. 4, 6a, 6b, and 6c, respectively. Inasmuch as the pocket portions 214, 224, 234, 244 are all disposed internally within the spokes of the wheels 210, 220, 230, 240, these wheels have an external appearance which is the same as that of the wheel 200 shown in FIG. 7.

Each of the pockets 214, 224, 234, 244 may be hollow, or may be filled with liquid or solid damping material 216, 226, 236, 246 as discussed above in relation to FIGS. 3, 4, 5a–5c and 6a–6c. The damping material disposed about the rim of each of the modified wheels 210, 220, 230, 240 is preferably a sheet of high damping material, the same as the damping material 209 shown in FIG. 7, but could, again, be modified to have a shape other than a thin sheet, and could be formed of other damping materials besides a high vibration damping material.

Again referring to FIG. 9, it is shown that when a wheel having a sheet of high vibration damping material 209 disposed about the rim 202 thereof also has hollow pockets 214, 224, 234, and/or 244 defined in spokes thereof according to any of FIGS. 8a–8d, the wheel 210, 220, 230 or 240 has a resonant frequency shifted to a higher value almost as high as the wheel 100 of FIGS. 3 and 4 with hollow pocket portions 114, and also has a noise level which is significantly reduced (e.g. by 10–40 decibels) over a portion of the vibration frequency range of the wheel extending from approximately 50 to 300 Hz.

On the other hand, and although not shown in FIG. 9, the modified wheels 210, 220, 230 and 240 having a liquid or solid vibration damping material 216, 226, 236, 246 in the pocket portions 214, 224, 234, 244 thereof, again, upwardly shift the resonant frequency of the wheel to a slightly lesser degree than when the pocket portions 214, 224, 234, 244 are hollow, but also desirably reduce the noise level caused by vibrations of the wheel to a further extent than if the pocket portions are hollow.

Table I below summarizes the desirable effects which are achieved by the wheels according to the first and second embodiments of the invention, as well as the modifications thereof, as shown in FIGS. 3–8d.

TABLE I

| Wheel Structural Characteristics | Shifting Resonant Frequency to higher value | Reduce energy of vibration |
| --- | --- | --- |
| Hollow Pockets Formed in Spokes | maximum effect | a minor effect |
| Pockets with Damping Material in Pockets | moderate effect | effective |
| Damping Material at Rim | a minor shift | effective |
| Damping Material at Rim and Hollow Pockets | effective | effective |
| Damping Material at Rim and Pockets With Damping Material Therein | moderate effect | maximum effect |

Although there have been described what are at present considered to be the preferred embodiments of the invention, it will be understood by persons skilled in the art that variations and modifications may be made thereto without departing from the gist, spirit or essence of the invention. For example, although the pocket portions according to the preferred embodiments and modifications of the preferred embodiments of the invention are enclosed within the spokes of the wheels, it is possible to construct the pocket portions which are not fully enclosed, especially if a liquid or solid vibration damping material is not disposed in the pocket portions. Accordingly, the scope of the invention is indicated by the appended claims, rather than by the foregoing discussion of presently preferred embodiments.

I claim:

1. An automotive road wheel with improved vibration characteristics, comprising:

a wheel body suitable for high speed travel;

at least one pocket defined in said wheel body for adjusting a resonant frequency of the wheel to a predetermined value; and said pocket being dimensioned and arranged within said wheel body to achieve a predetermined vibration characteristic of the wheel during automotive travel corresponding to said predetermined resonant frequency.

2. An automotive road wheel according to claim 1, wherein said wheel body is formed from at least one of aluminum and a lightweight metal alloy.

3. An automotive road wheel according to claim 1, wherein said pocket is an enclosed space within the wheel body.

4. An automotive road wheel according to claim 1, wherein said wheel body has a plurality of said pockets defined therein.

5. An automotive road wheel according to claim 1, further including:

a vibration damping material disposed in the pocket.

6. An automotive road wheel according to claim 5, wherein said vibration damping material comprises at least one of a liquid material, and solid material, and a foam.

7. An automotive road wheel according to claim 1, wherein said wheel body includes a rim, a hub, and a plurality of spokes connected radially between the rim and the hub; and said pocket is defined in one of a radially inner section of said spoke, a radially intermediate section of said spoke, and a radially outer section of one said spoke.

8. An automotive wheel body according to claim 1, wherein said wheel body includes a rim and further includes a vibration damping material secured to said wheel body for reducing a noise level caused by vibrations of the wheel body, and said vibration damping material is engaged with at least one of said pocket and a rim of the wheel body.

9. An automotive wheel body according to claim 1, wherein said pocket is dimensioned and arranged to shift a road noise peak of vibrations of the wheel to a higher frequency away from another road noise peak of vibrations of the wheel at a lower frequency.

10. An automotive wheel body according to claim 1, wherein said pocket is dimensioned and arranged to shift a high level road noise peak of vibrations of the wheel to approximately 400 Hz or higher.

11. An automotive wheel body according to claim 1, wherein said wheel body includes a rim, a hub, and a plurality of spokes connected radially between the rim and the hub; and said pocket occupies a small portion of one said spoke.

12. A wheel for a vehicle comprising:

a rim extending circumferentially around said wheel;

a hub formed coaxially with said rim;

a plurality of spokes connected radially between said hub and said rim;

a layer of vibration damping material disposed coaxially about said rim, and substantially completely covering and flushly engaging an outer surface of the rim that is covered when a tire is fitted over the rim, for reducing a noise level of vibrations of the wheel during travel;

at least one of said spokes having a modified portion formed therein for altering a resonant frequency of vibrations of the wheel; and said modified portion being dimensioned and arranged within said spoke to achieve a predetermined vibration characteristic of the wheel during automotive travel corresponding to a predetermined resonant frequency of the wheel.

* * * * *

UNITED STATES PATENT AND TRADEMARK OFFICE
CERTIFICATE OF CORRECTION

PATENT NO. : 6,106,075
DATED : 22 August 2000
INVENTOR(S) : Toshihiko Suenaga It is certified that error appears in the above-identified patent and that said Letters Patent is hereby corrected as shown below:

Column 2, line 25, change "film" to --fulfill--.
Column 3, line 47, after "it" insert --is--.
Column 9, line 37 (claim 6, 3rd line), change "and solid" to --a solid--.

Signed and Sealed this

First Day of May, 2001

Attest:

NICHOLAS P. GODICI

Attesting Officer        Acting Director of the United States Patent and Trademark Office